Sept. 19, 1961

J. S. GREGORIUS ET AL 3,000,141

LEHR

Filed Sept. 5, 1957

INVENTORS
JOSEPH S. GREGORIUS
THOMAS R. REED and
HORACE W. GARDNER

BY

Oscar L Spencer

ATTORNEY

Sept. 19, 1961   J. S. GREGORIUS ET AL   3,000,141
LEHR
Filed Sept. 5, 1957   8 Sheets-Sheet 3

INVENTORS
JOSEPH S. GREGORIUS
THOMAS R. REED
BY HORACE W. GARDNER

ATTORNEY

Fig. 4.

INVENTORS
JOSEPH S. GREGORIUS
THOMAS R. REED and
BY HORACE W. GARDNER

ATTORNEY

Sept. 19, 1961   J. S. GREGORIUS ET AL   3,000,141
LEHR
Filed Sept. 5, 1957   8 Sheets-Sheet 6

INVENTORS
JOSEPH S. GREGORIUS
THOMAS R. REED and
BY HORACE W. GARDNER

ATTORNEY

Fig. 7.

INVENTORS
JOSEPH S. GREGORIUS
THOMAS R. REED
BY HORACE W. GARDNER
ATTORNEY

Sept. 19, 1961    J. S. GREGORIUS ET AL    3,000,141

LEHR

Filed Sept. 5, 1957    8 Sheets-Sheet 8

Fig. 8.

INVENTORS
JOSEPH S. GREGORIUS
THOMAS R. REED and
HORACE W. GARDNER
BY

*Oscar L. Spencer*
ATTORNEY

United States Patent Office 3,000,141
Patented Sept. 19, 1961

3,000,141
LEHR
Joseph S. Gregorius, Tarentum, and Thomas R. Reed and Horace W. Gardner, Pittsburgh, Pa., assignors to Pittsburgh Plate Glass Company, Allegheny County, Pa.
Filed Sept. 5, 1957, Ser. No. 682,241
5 Claims. (Cl. 49—47)

This invention relates to apparatus for annealing glass, such as plate glass, and it has particular relation to lehrs of the elongated tunnel type through which a continuous ribbon of plate glass is transported by conveyor means from the forming rolls, and in which the glass is subjected to varying temperature environments in order to relieve strains that may exist in the glass.

The prior art is replete with disclosures of lehrs of the tunnel type provided with a plurality of longitudinally disposed ducts above and/or below the conveyor means for the passage of a cooling fluid, such as air. Many of the prior art devices employ fans or blowers located adjacent the hot end of the lehr for drawing the cooling air through the ducts, the cooling air traveling in a direction opposite to that of the glass. These prior art devices may be provided with flues vertically extending from the ducts and positioned at spaced intervals along the length of the ducts for allowing cooler air to be introduced and mixed with the duct air for controlling the temperature gradient from the hot to the cool end of the lehr. Other prior art devices employ the vertically extending flues for withdrawing a portion of the cooling air from the ducts, this arrangement also being for the purpose of controlling the temperature gradient of the lehr.

The lehr forming the subject matter of this invention is also provided with a plurality of longitudinally extending ducts. However, these ducts are divided into a plurality of longitudinal interconnected sections, adjacent sections being also connected to a chamber in which is disposed a blower or a fan. Each chamber is provided with the necessary means for allowing an exhaust of cooling fluid from the ducts, or an intake of cooling fluid to the ducts. Each of the duct sections may, if desired, be connected in such a manner that the means for exhausting and intaking of air and the blower or fan will be inoperative, this being accomplished with suitable dampers and the like. The flow of cooling air through each of the ducts may be controlled independently of the flow of cooling air through the other of the ducts. In addition to the above, means are provided for indicating the temperature in each of the ducts at spaced points along the longitudinal extent of the various sections, and also, means are provided to indicate the temperature of the glass ribbon on a transverse axis as it passes from the hot to the cool end of the lehr. It may thus be understood that the structure broadly described is constructed so that the temperature gradient of the lehr from the hot to the cold end may be accurately controlled, and therefore the glass ribbon will be annealed to be substantially free from strain. The ribbon in its annealed state may be cut easily into sheets and will be free of warp. Therefore, the primary object of this invention is the provision of an improved annealing lehr especially adaptable for annealing a continuous ribbon of plate glass.

Another object of this invention is the provision of an improved annealing lehr of the elongated tunnel type wherein there are provided a plurality of longitudinally extending ducts for the passage of cooling fluid and having means whereby the temperature gradient in the lehr and in the ducts may be accurately controlled.

Another object of this invention is the provision of an improved annealing lehr for annealing plate glass of the elongated tunnel type having a conveyor means, a plurality of longitudinal ducts in proximity to the conveyor means for the passage of a cooling fluid relative to the glass, each duct including a plurality of interconnected longitudinal sections, and means associated with adjacent sections for controlling the quantity and quality of the cooling fluid flowing through the ducts.

A still further object of this invention is the provision of an improved annealing lehr of the elongated tunnel type having a plurality of top and bottom longitudinally extending ducts, each duct comprising a plurality of longitudinal connected sections, the adjacent sections being connected to a plenum chamber and having the necessary means associated with the chamber for controlling the flow of cooling fluid through the ducts.

These and other objects and features of the invention will become apparent from the following description when taken with the accompanying drawings, in which.

Referring now to the drawings, wherein the same reference characters refer to like parts, and in particular to FIGURES 1A, 1B, 1C, 1D, and 7 there is illustrated schematically a tunnel type annealing lehr, generally identified as 10, having a plurality of upper and lower longitudinally extending ducts therein in side-by-side relation and in proximity to and spaced from a suitable conveying means for the passage of cooling fluid relative to a ribbon of glass being conveyed from one end to the other end of the lehr. The lehr, in its preferred environment, is disposed closely adjacent the forming rolls of a plate glass furnace, so as to receive the ribbon of glass as it issues from between the rolls.

Figure 7:
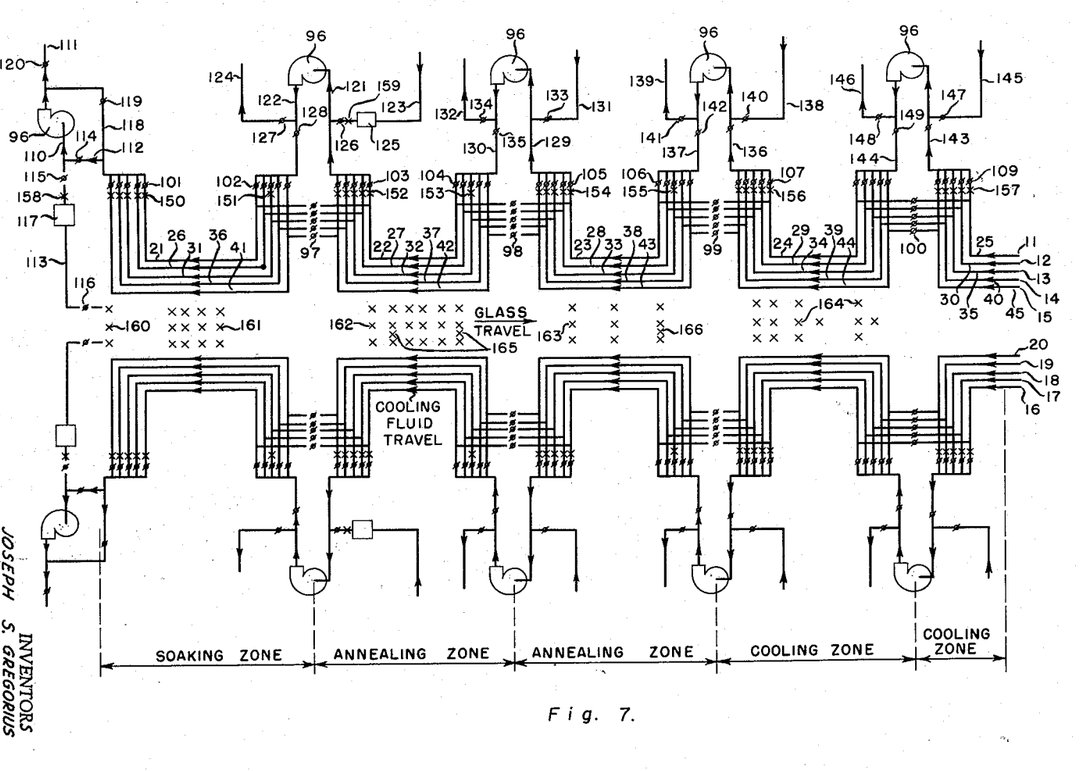
FIGURE 7 is a schematic illustration of the lehr ducts, the means for controlling the quantity and quality of the cooling fluid therein, and the means to take the temperatures of the cooling fluid and the glass ribbon.

As illustrated, there are five such ducts, 11, 12, 13, 14 and 15 in side-by-side relation in the upper part of the lehr, and a corresponding number of ducts, 16, 17, 18, 19 and 20 in the lower part of the lehr, the latter not being shown in FIGURES 1A, 1B, 1C or 1D, but being indicated in FIGURE 7. Of course, there may be greater or lesser number of ducts without departing from the spirit of this invention. Each duct is constructed in a plurality of interconnected sections, namely, duct 11 is constructed in sections 21, 22, 23, 24 and 25; duct 12 is constructed in sections 26, 27, 28, 29 and 30; duct 13 is constructed in sections 31, 32, 33, 34 and 35; duct 14 is constructed in sections 36, 37, 38, 39 and 40; and duct 15 is constructed in sections 41, 42, 43, 44 and 45. Since the bottom ducts are constructed in the same manner as the top ducts, and have the same means associated therewith for controlling the quantity and quality of cooling fluid therein, the following description will refer only to the top ducts, it being understood that it is also applicable to the bottom ducts. The number of sections in each duct may be greater or less than the five identified without departing from the spirit of this invention.

The lehr 10 may be considered as divided into three parts, i.e., a soaking zone, an annealing zone and a cooling zone, and the latter two zones are each described as divided into two parts.

The duct sections 21, 26, 31, 36 and 41 are associated with the soaking zone; the duct sections 22, 27, 32, 37 and 42 are associated with the first part of the annealing zone; the duct sections 23, 28, 33, 38 and 43 are associated with the second part of the annealing zone; the duct sections 24, 29, 34, 39 and 44 are associated with the first part of the cooling zone; and the duct sections 25, 30, 35, 40 and 45 are associated with the second part of the cooling zone.

The duct sections adjacent the entrance or hot end of the lehr 10, namely, 21, 26, 31, 36 and 41 terminate adjacent and spaced from the end of the lehr in vertically extending headers 46, 47, 48, 49 and 50, respectively, and are provided adjacent their opposite ends with vertically extending headers 51, 52, 53, 54 and 55. The duct sections 22, 27, 32, 37 and 42 are provided adjacent their terminal ends with vertically extending headers 56, 57, 58, 59, 60, 61, 62, 63, 64 and 65. The duct sections 23, 28, 33, 38 and 43 are provided adjacent their terminal ends with vertically extending headers 66, 67, 68, 69, 70, 71, 72, 73, 74 and 75. The duct sections 24, 29, 34, 39 and 44 are provided adjacent their terminal ends with vertically extending headers 76, 77, 78, 79, 80, 81, 82, 83, 84 and 85. The duct sections 25, 30, 35, 40 and 45 are open at their terminal ends adjacent the exit or cold end of the lehr and are provided with vertically extending headers 86, 87, 88, 89 and 90 adjacent their opposite terminal ends.

The headers 46, 47, 48, 49 and 50 terminate in a conduit 118; the headers 51, 52, 53, 54 and 55 terminate in a conduit 122; the headers 56, 57, 58, 59 and 60 terminate in a conduit 121; the headers 61, 62, 63, 64 and 65 terminate in a conduit 130; the headers 66, 67, 68, 69 and 70 terminate in a conduit 129; the headers 71, 72, 73, 74 and 75 terminate in a conduit 137; the headers 76, 77, 78, 79 and 80 terminate in a conduit 136; the headers 81, 82, 83, 84 and 85 terminate in a conduit 144; and the headers 86, 87, 88, 89 and 90 terminate in a conduit 143.

A damper 97 is provided at each of the junctures of the duct sections 21 and 22, 26 and 27, 31 and 32, 36 and 37, and 41 and 42; a damper 98 is provided at each of the junctures of the sections 22 and 23, 27 and 28, 32 and 33, 37 and 38, and 42 and 43; a damper 99 is provided at each of the junctures of the sections 23 and 24, 28 and 29, 33 and 34, 38 and 39, and 44 and 45; and a damper 100 is provided at each of the junctures of the sections 24 and 25, 29 and 30, 34 and 35, 39 and 40, and 44 and 45.

A damper 101 is provided in each of the headers 46, 47, 48, 49 and 50; a damper 102 is provided in each of the headers 51, 52, 53, 54 and 55; a damper 103 is provided in each of the headers 56, 57, 58, 59 and 60; a damper 104 is provided in each of the headers 61, 62, 63, 64 and 65; a damper 105 is provided in each of the headers 66, 67, 68, 69 and 70; a damper 106 is provided in each of the headers 71, 72, 73, 74 and 75; a damper 107 is provided in each of the headers 76, 77, 78, 79 and 80; a damper 108 is provided in each of the headers 81, 82, 83, 84 and 85; and a damper 109 is provided in each of the headers 86, 87, 88, 89 and 90.

Fans or blowers 96 are disposed within the chambers 91 to 95. The fan 96 in the chamber 91, the one adjacent the hot end of the lehr 10, is provided with an inlet 110 and an outlet 111. The inlet 110 is connected to the headers 46, 47, 48, 49 and 50 by means of a conduit 112 and with the interior of the lehr by means of a conduit 113. A damper 114 is provided in the conduit 112 and a pair of dampers 115 and 116 are provided in the conduit 113 adjacent the opposite sides of a heating means 117. A conduit 118 connects the headers 46, 47, 48, 49 and 50 to the outlet 111 and is provided with a damper 119. A damper 120 is provided in the outlet 111, as illustrated.

The fan 96 in the chamber 92 is provided with an inlet 121 and an outlet 122 to which are respectively connected an intake conduit 123 and an exhaust conduit 124, the conduit 123 being provided with a heating means 125. The conduits 122 and 121 respectively communicate with the headers 51, 52, 53, 54 and 55, and 56, 57, 58, 59 and 60. The conduit 123 is provided with a damper 126 and the conduits 122 and 124 are provided, respectively, with dampers 127 and 128.

The fan 96 in the chamber 93 is provided with an inlet 129 and an outlet 130 to which are respectively connected an intake conduit 131 and an exhaust conduit 132, the inlet 129 being connected to the headers 66, 67, 68, 69 and 70, and the outlet being connected to the headers 61, 62, 63, 64 and 65. The conduit 131 is provided with a damper 133; the conduit 132 is provided with a damper 134; and the outlet 130 is provided with a damper 135.

The fan 96 is the chamber 94 is provided with an inlet 136 and an outlet 137 to which are respectively connected an intake conduit 138 and an exhaust conduit 139, the inlet 136 being connected to the headers 76, 77, 78, 79 and 80 and the outlet 137 being connected to the headers 71, 72, 73, 74 and 75. The conduit 138 is provided with a damper 140; the conduit 139 is provided with a damper 141; and the conduit 137 is provided with a damper 142.

The fan 96 in the chamber 95 is provided with an inlet 143 and an outlet 144 having respectively connected thereto an intake conduit 145 and an exhaust conduit 146, the inlet 143 being connected to the headers 86, 87, 88, 89 and 90 and the outlet 144 being connected to the headers 81, 82, 83, 84 and 85. The conduit 145 is provided with a damper 147; the conduit 146 is provided with a damper 148; and the outlet 144 is provided with a damper 149.

The above-mentioned fans with their associated inlets, outlets, conduits and dampers constitute control means for withdrawing air from the outlets of each duct section and for selectively introducing air from a duct section and the ambient atmosphere into the inlet of a preceding next adjacent and connected duct section. Dampers 97 to 100 provide means for selectively by-passing the fans and associated conduits.

As previously mentioned, means are provided for taking the temperatures of the cooling fluid in the ducts and also of the ribbon of glass traveling through the lehrs.

Thus, means, such as thermocouples 150, are provided in the duct sections 21, 26, 31, 36 and 41 adjacent the headers 46, 47, 48, 49 and 50, respectively; a thermocouple 151 is provided in the duct section 31 adjacent the header 53; thermocouples 152 are provided in the duct sections 22, 27, 32, 37 and 42 adjacent the headers 56, 57, 58, 59 and 60, respectively; a thermocouple 153 is provided in the section 32 adjacent the header 63; thermocouples 154 are provided in the duct sections 23, 28, 33, 38 and 43 adjacent the headers 66, 67, 68, 69 and 70, respectively; a thermocouple 155 is provided in the section 33 adjacent the header 73; thermocouples 156 are provided in the duct sections 24, 29, 34, 39 and 44 adjacent the headers 76, 77, 78, 79 and 80, respectively; and thermocouples 157 are provided in the duct sections 25, 30, 35, 40 and 45 adjacent the headers 86, 87, 88, 89 and 90, respectively. A thermocouple 158 is provided in the conduit 113 and a thermocouple 159 is provided in the conduit 123, the thermocouples being adjacent the heater means 117 and 124, respectively.

A series of thermocouples 160 is provided at the entrance or hot end of the lehr and are positioned to be closely adjacent the top of the glass sheet as it travels through the lehr. On a transverse axis, there are three such thermocouples, the outer two of which are positioned for taking the temperatures of the edges of the ribbon, and a center of which is positioned for taking the temperature of the center of the ribbon.

Series of similarly arranged thermocouples 161, 162, 163 and 164 are provided in the soaking zone, the first part of the annealing zone, the second part of the annealing zone and the first part of the cooling zone, respectively, and the thermocouples 165 and 166 are provided in the first and second parts of the annealing zones respectively for taking the temperature of the bottom of the ribbon.

Each thermocouple is connected to a suitable means (not shown) whereby the temperatures may be read, recorded, etc.

Turning now to FIGURES 2 to 6 inclusive, a more detailed description of the lehr construction follows.

Figure 1A:
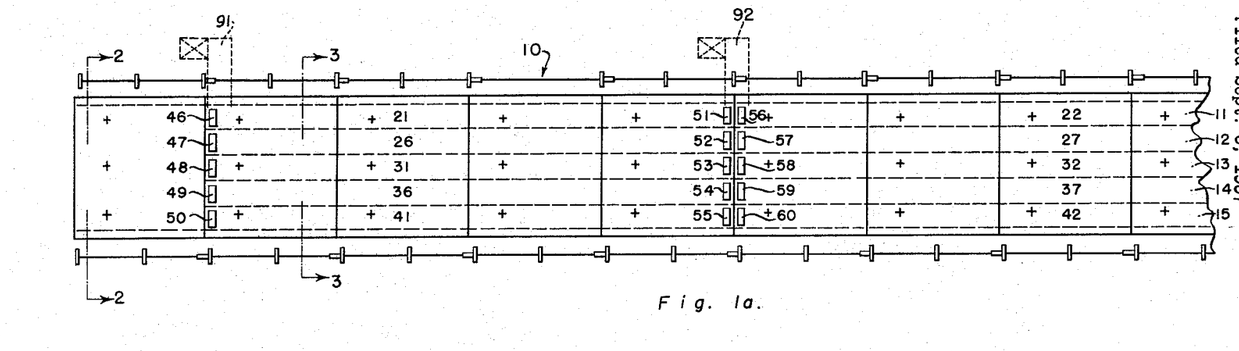
FIGURES 1A, 1B, 1C and 1D are schematic plan views of portions of the lehr of this invention and when assembled in sequence illustrate the complete lehr from its entrance or hot end to its exit or cold end.
Figure 1B:
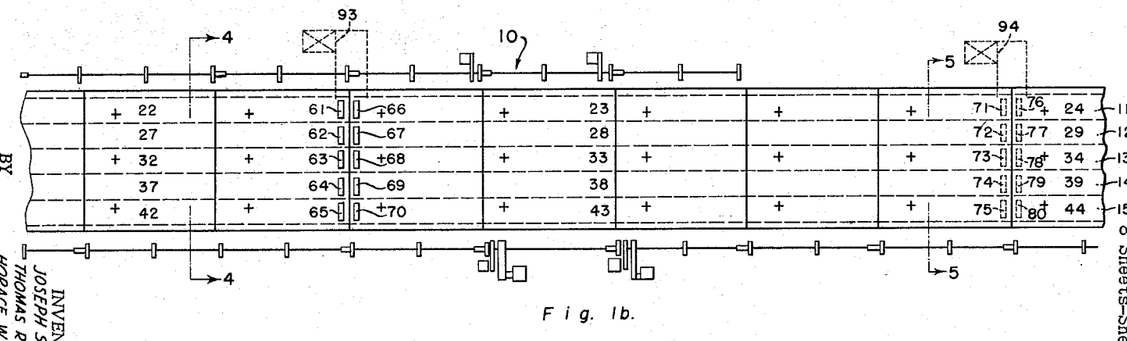
Figure 1C:
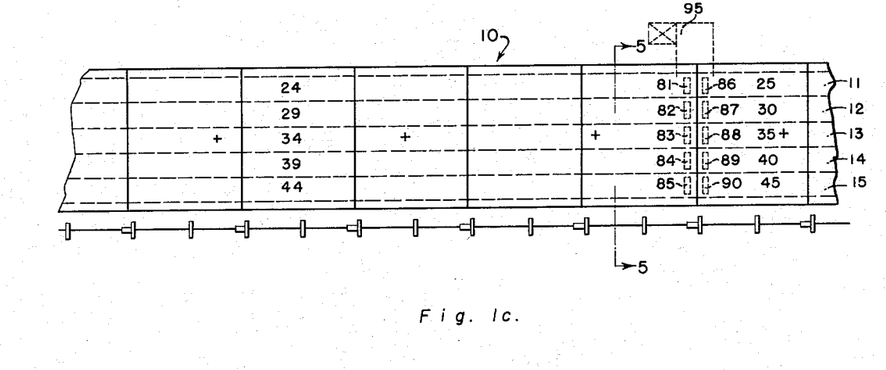
Figure 1D:
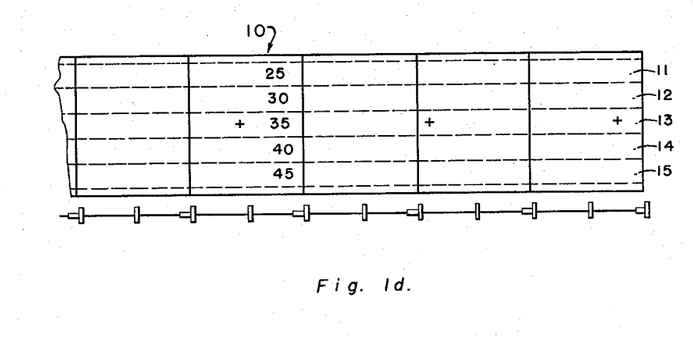
Figure 2:
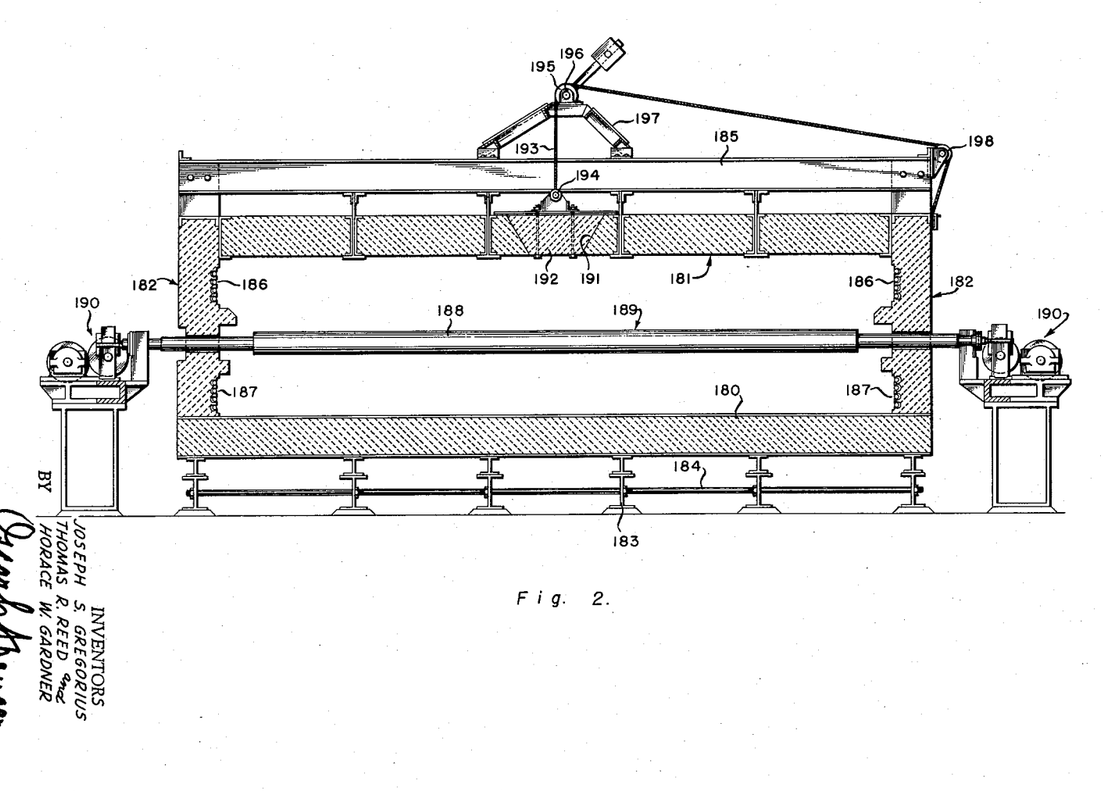
FIGURE 2 is an enlarged cross-sectional view of the lehr taken on line 2—2 of FIGURE 1A.
Figure 3:
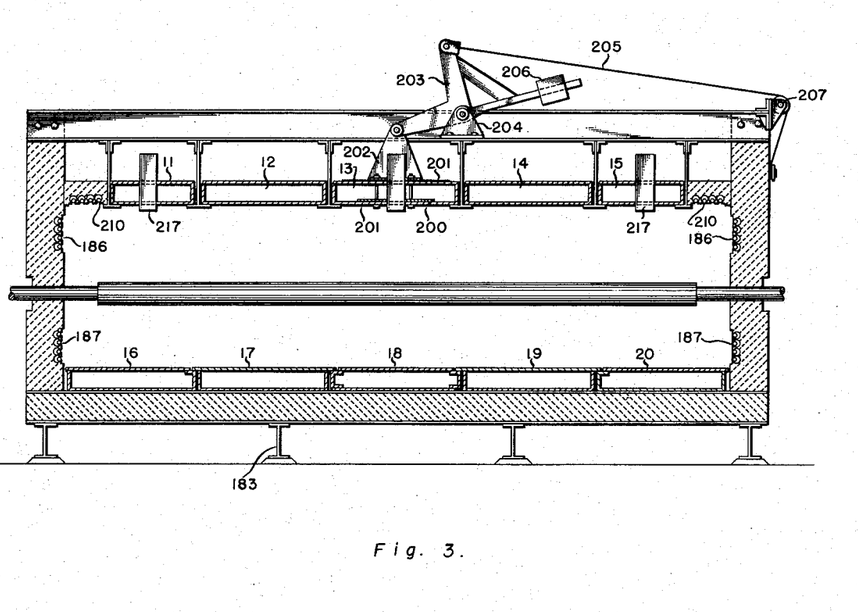
FIGURE 3 is an enlarged cross-sectional view taken on line 3—3 of FIGURE 1A.
Figure 4:
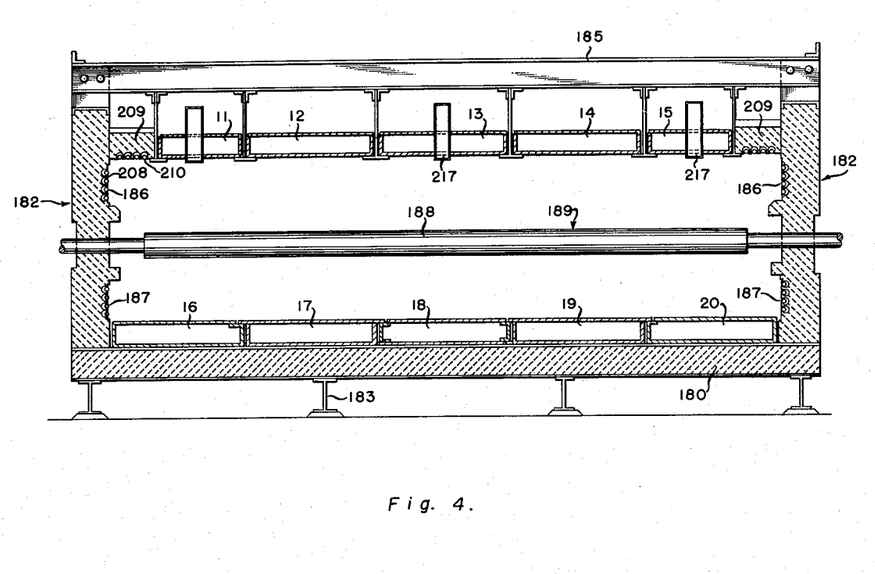
FIGURE 4 is an enlarged cross-sectional view taken on line 4—4 of FIGURE 1B.
Figure 5:
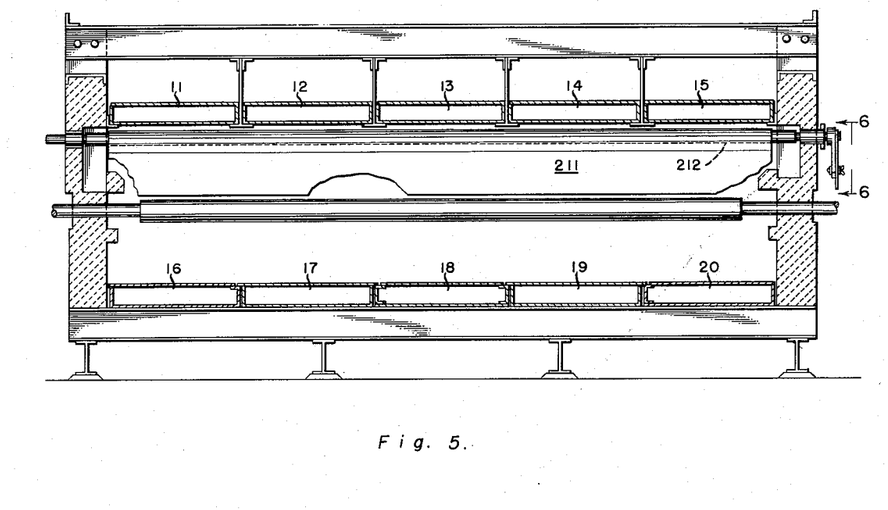
FIGURE 5 is an enlarged cross-sectional view taken either on line 5—5 of FIGURE 1B or on line 5a—5a of FIGURE 1C.

As illustrated, the lehr 10 is of shell construction having a bottom 180, a roof 181 and slide walls 182. As illustrated in FIGURE 2, the top ducts 11, 12, 13, 14 and 15, and the bottom ducts 16, 17, 18, 19 and 20, previously described, do not extend to the terminal end of the hot end of the lehr. The bottom of the lehr is constructed of metal shells having, at least for a portion of its length, and especially in the soaking and annealing zones, insulating material therein. The bottom is supported by means of a plurality of longitudinally extending I-beams 183 tied together transversely by means of tie rods 184. The end construction of the lehr is especially illustrated in FIGURE 2. FIGURES 3, 4 and 5 show the bottom 180 supporting the plurality of longitudinally extending side-by-side ducts 16, 17, 18, 19 and 20.

The roof 181 of the lehr at the hot end, as illustrated in FIGURE 2, is constructed of a plurality of connected metal shells having insulating material therein. Adjacent this construction, and as illustrated in FIGURES 3, 4 and 5, the roof 181 is constructed of the plurality of longitudinally extending side-by-side ducts 11, 12, 13, 14 and 15. The shells and ducts are supported by means of a plurality of transversely arranged roof I-beams 185 supported at their opposite ends on the side walls 182, and insulating material may be provided over the ducts where necessary or desired.

The side walls 182 are likewise of metal shell construction having insulating material therein, upper and lower longitudinal portions of the insulating material 186 and 187 in the soaking and annealing zones being exposed to the interior of the tunnel and having longitudinal grooves therein for purposes which will later be described.

The side walls 182 are formed to support a plurality of spaced rolls 188 which form the conveyor means, generally identified at 189, for conveying the glass ribbon through the lehr from its entrance or hot end to its exit or cold end. Driving means 190 are provided at the opposite ends of the rolls 188 for rotating the rolls, and since the driving means 190 do not form a part of this invention, further detailed description is deemed unnecessary.

Adjacent the entrance or hot end of the lehr 10 (see FIGURE 2) the roof 181 is provided with an opening 191 to receive a vertically movable cover member 192 having a cable 193 connected thereto, as at 194. The cable 193 passes over a pulley 195 fixed to a shaft 196 supported by a structure 197 on the top of the lehr. The cable passes over another pulley 198 supported adjacent one terminal end of a roof I-beam 185 so that it may be grasped by an operator to raise the cover and allow hot gases within the tunnel to escape when the temperature at the hot end is too high. A counterweight 199 is fixed to the shaft 196 to assist the operator in raising the cover member 192.

As illustrated in FIGURE 3, a cross-section through the soaking zone, the central upper duct 13 may be provided with a plurality of openings 200 closed by means of vertically movable and spaced cover plates 201 connected by means of an upstanding plate member 202 to a linkage means 203 pivotable as at 204 having a cable 205 and a counterweight 206 attached thereto. The cable passes over a pulley 207 supported as illustrated, so that the cover plates may be lifted from the openings and allow the escape of hot tunnel gases when the temperature in the soaking zone becomes excessive. The counterweight 206 assists the operator in raising the cover members.

As illustrated in FIGURES 2, 3 and 4, the side wall portions 186 and 187, previously described as being grooved, receive heater means 208 such as electrical heater coils for supplying heat to the interior of the lehr 10 in the soaking and annealing zones. Also, as illustrated in FIGURES 3 and 4, the outer top ducts 11 and 15 are slightly reduced in width in the soaking and annealing zones and abut against blocks of insulating material 209 which are grooved to receive heater means 210 such as electrical heater coils. The heater coils 208 and 210 are connected to suitable control means (not shown) and are positioned so that the greatest heat will be applied to the edges of the ribbon which are at a lower temperature than the middle of the ribbon since, in the forming operation, the edges contact forming guns which tend to chill them.

Figure 6:
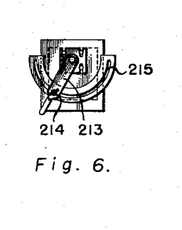
FIGURE 6 is a view taken on line 6—6 of FIGURE 5.

As illustrated in FIGURE 5, adjustable asbestos curtains 211 are provided at spaced points in the cooling zone of the lehr. These curtains are supported on a rotatable shaft 212 so that the curtain may be raised or lowered. The shaft 212 is provided with an operating handle 213, as illustrated in FIGURE 6, having guide means 214 received in an arcuate slot 215 in a plate member 216 supported from the lehr side wall. By moving the handle between the limits of the arcuate slot, the vertical position of the curtain may be varied.

As illustrated in FIGURES 3 and 4 there are provided a plurality of cylindrical members 217 passing through the ducts 11, 13 and 15. Each of these cylindrical members receives a thermocouple, such as 160, 161, 162, 163, or 164 for taking the temperature of the ribbon of glass as it passes through the lehr. The bottom thermocouples 165 and 166 merely extend through the side walls of the lehr in a conventional manner.

Figure 8:
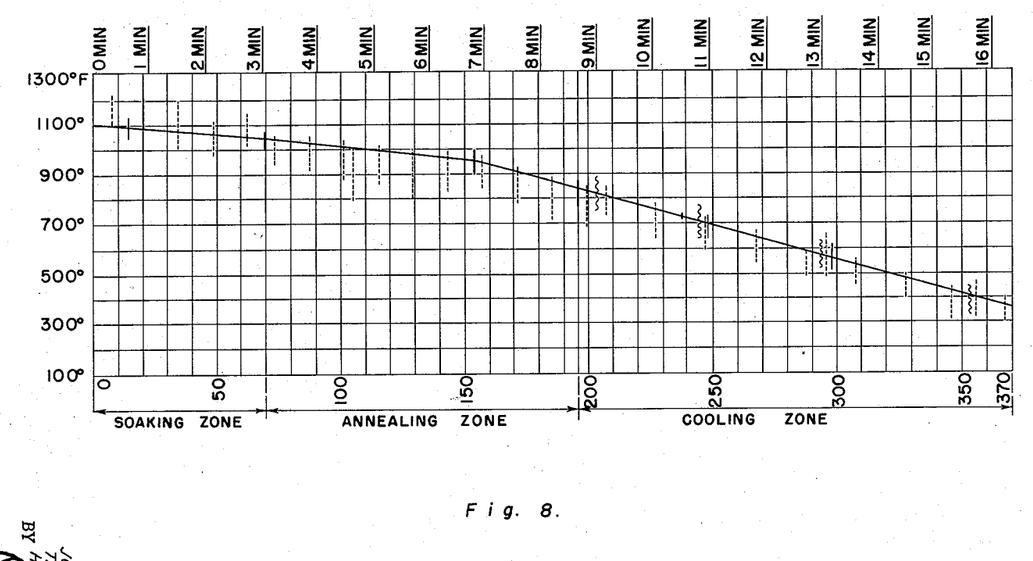
FIGURE 8 illustrates an annealing curve having temperatures plotted against time and length of the lehr.

Attention is now directed to FIGURE 8 showing a curve of the temperature range through the soaking zone, the annealing zone and the cooling zone. This curve, also plotted against time, indicates the time required for passage of the glass from the hot end to the cold end of the lehr for a particular speed of travel. The placement of the thermocouples for taking the temperature of the glass ribbon are indicated and identified by dotted lines, and the location of the various fan chambers and the headers communicating with the ducts are indicated and identified by solid, straight lines. The locations of the asbestos curtains are indicated and identified by the wavy lines.

The glass ribbon, shortly after it is formed, passes into the soaking zone of the lehr 10 where it is reheated in order to bring it to a substantially uniform temperature across its width, this being necessary because, among other things, the edges of the ribbon are somewhat chilled by their contact with an edge forming gun. With reference to the curve of FIGURE 8, it will be noted that the glass passes through a temperature range in the soaking zone of approximately 1100° F. to 1050° F. In the annealing zone the glass passes through a temperature range of approximately 1050° F. to 850° F. The temperature range of 1050° F. to 950° F., that in the first part of the annealing zone, is the critical annealing range wherein the actual annealing of the glass occurs. The further cooling of the glass has practically no effect thereon except to bring it to a temperature for handling. It will be also noted that the glass is taken through the critical annealing range in a longer period of time than through the remainder of the annealing range. In the cooling zone, the temperature of the glass is reduced from approximately 850° F. to 350° F., the cooling of the glass taking place in a relatively gradual manner.

The length of the lehr and the temperatures through which the glass passes may vary due to the speed of the glass as it is conveyed through the lehr, the temperature at which it is introduced into the lehr, and its thickness. For purposes of description and as a specific example of the lehr, as indicated in FIGURE 8, the lehr is 370 feet long, the length including a soaking zone of 70 feet, a first part of the annealing zone of 84 feet, a second part of the annealing zone of 42 feet (making a total annealing zone of 126 feet), a first part of the cooling zone of 102 feet and a second part of the cooling zone of 72 feet (making the cooling zone 174 feet long). In the specific example indicated in FIGURE 8 it requires approximately 16 minutes for any discrete particle of glass to pass from the hot to the cold end of the lehr.

Once an annealing curve is decided on, such as the curve of FIGURE 8, the lehr, because of its flexibility, may be operated in such a manner that the temperature of the glass ribbon as it travels through the lehr will follow the curve. This entails the taking of the temperature of the ribbon at spaced positions during its travel by means of the thermocouples, such as 160, 161, 162, 163, 164, 165 and 166, the operation of the closure members 192 and 201 in the soaking zone, the controlling of the heat from the heater means 117 and 125, and the controlling of the quantity and quality, i.e., the amount and the temperature of the cooling fluid in the ducts. The cooling fluid, such as air, which preferably travels in a direction opposite to that of the glass ribbon, as indicated in FIGURE 7, is controlled by the various fans or blowers 96, heaters 117, 125 and dampers. Each duct may be controlled independently of the others by means of the various dampers provided, thus adding to the flexibility of the arrangement.

For example, the side and top edge heaters 208 and 210 may supply heat to bring the edges of the ribbon to the temperature of its middle portion, so as to equalize the temperature across the ribbon. Any one or more of the fans or blowers 96 may be inoperative, so that, with the dampers, such as 97, 98, 99 or 100 open, cooling fluid will flow through the duct junctures without passing through the respective headers. Or one or more of the dampers 97, 98, 99 or 100 may be open to allow flow through the duct juncture, while others of the dampers may be closed, thereby allowing flow through the respective headers and into the fan chamber where the fluid may be exhausted through the associated exhaust conduit. Other and cooler fluid may be introduced through the intake conduit, so that the quantity and quality of cooling fluid in the ducts may differ in one or more of the adjacent duct sections.

The arrangement at the hot end of the lehr allows, when the fan 96 is not operating, a passage of cooling fluid either to exhaust to the atmosphere or to the interior of the tunnel. For example, with damper 114 closed and dampers 119 and 120 open, fluid from the ducts will exhaust to the atmosphere. With damper 120 closed and dampers 114, 115 and 116 open, air will exhaust to the interior of the tunnel. When the fan is operating, fluid from the duct and/or from the interior of the tunnel may be exhausted to the atmosphere. For example, with dampers 115 and 119 closed and dampers 114 and 120 open, fluid from the duct will be exhausted to the atmosphere. With dampers 114 and 119 closed and dampers 115, 116 and 120 open, fluid from the interior of the tunnel will be exhausted to the atmosphere. With the damper 119 closed and dampers 114, 115, 116 and 120 open, fluid from both the ducts and the interior of the tunnel will be exhausted to the atmosphere.

The heaters 117 and 125, when energized, will heat fluid for introduction into the tunnel or into the ducts, respectfully.

Many more examples of operation could be given, which would further illustrate the flexibility of the construction; however, with the various controls, etc., it is considered that the operation of the lehr will be apparent from the previous description to one skilled in the art.

While this invention has been described with reference to a preferred construction, it is to be understood that this is by way of illustration and not by way of limitation.

We claim:

1. A lehr for annealing glass comprising a tunnel having an entrance and an exit and characterized by a temperature gradient between said entrance and said exit, a conveyor extending longitudinally through said tunnel for conveying glass from said entrance to said exit, transversely arranged longitudinally extending ducts in said tunnel in proximity to said conveyer, each duct being constructed of a plurality of sections, inlets and outlets to each section of said ducts, means for selectively withdrawing air from the outlet of each duct section and selectively discharging said air to the ambient atmosphere, and means for selectively introducing air from the ambient atmosphere and from the outlet of each duct section into the inlet of the next preceding duct section.

2. A lehr as recited in claim 1 wherein said withdrawing and introducing means include blowers at spaced locations longitudinally of the lehr, each operatively associated by conduits to the duct sections.

3. A lehr as recited in claim 2 wherein the means for selectively withdrawing air and the means for selectively introducing air include adjustable dampers operatively associated with said conduits and so constructed and arranged as to control the amount of air flowing through the duct sections.

4. A lehr as recited in claim 2 further including a heating means operatively associated with an air intake and one of said blowers, and being so constructed and arranged for heating the intake of air from the ambient atmosphere.

5. A lehr as recited in claim 2 further including means for selectively bypassing the withdrawing means and the introducing means; and a blower means operatively associated with one of the terminal ends of said ducts and said tunnel, said last mentioned blower means being so constructed and arranged to withdraw air from said ducts and from said tunnel.

References Cited in the file of this patent
UNITED STATES PATENTS

| | | |
|---|---|---|
| 1,165,585 | Fox | Dec. 28, 1915 |
| 1,486,265 | Pike | Mar. 11, 1924 |
| 1,560,481 | Mulholland | Nov. 3, 1925 |
| 1,828,070 | Pryor et al. | Oct. 20, 1931 |
| 1,853,878 | Paxton | Apr. 12, 1932 |